(12) United States Patent
Zettel

(10) Patent No.: US 6,286,840 B1
(45) Date of Patent: Sep. 11, 2001

(54) MODIFIED V SEAL WITH PROTRUSIONS

(75) Inventor: Steven A. Zettel, Cranston, RI (US)

(73) Assignee: ACS Industries, Inc., Woonsocket, RI (US)

( * ) Notice: Subject to any disclaimer, the term of this patent is extended or adjusted under 35 U.S.C. 154(b) by 0 days.

(21) Appl. No.: 09/459,733

(22) Filed: Dec. 13, 1999

(51) Int. Cl.⁷ ............................. F16J 15/02; F16J 15/08
(52) U.S. Cl. ............................................ 277/647; 277/650
(58) Field of Search ........................... 277/530, 537, 277/630, 628, 644, 647, 648, 650, 654

(56) References Cited

U.S. PATENT DOCUMENTS

| | | |
|---|---|---|
| 1,246,089 * | 11/1917 | Greenoe . |
| 2,442,687 * | 9/1948 | Heathcott . |
| 2,841,429 * | 7/1958 | McCuistion . |
| 3,288,475 * | 11/1966 | Benoit . |
| 3,341,211 * | 9/1967 | Hughton et al. . |
| 3,790,179 * | 2/1974 | Scannell . |
| 3,833,228 * | 9/1974 | Gilliam, Sr. . |
| 4,157,833 * | 6/1979 | Kozlowski . |
| 4,547,434 * | 10/1985 | Sumiyoshi et al. . |
| 4,683,010 * | 7/1987 | Hartmann . |

* cited by examiner

Primary Examiner—Anthony Knight
Assistant Examiner—Vishal Patel
(74) Attorney, Agent, or Firm—Hopgood, Calimafde, Judlowe & Mondolino LLP

(57) ABSTRACT

An knitted wire mesh seal, such as for use in catalytic converters, is provided with a plurality of protrusions to prevent complete nesting of adjacent seals. When packaged and shipped, seals that do not completely nest prevent accidental assembly of two seals.

19 Claims, 7 Drawing Sheets

MODIFIED V SEAL WITH PROTRUSIONS

BACKGROUND OF THE INVENTION

1. Field of the Invention

The present invention relates to seals and more particularly to seals made of compacted knitted wire with a V-shaped cross section having protrusions for preventing complete nesting of the seals during packaging and shipping. Specifically, a seal of the type described in U.S. Pat. No. 4,683,010, which is hereby incorporated by reference in its entirety, has been modified and improved upon.

2. State of the Art

It is generally known that seals and/or gaskets which are suitable for some applications can be made from compacted knitted-wire elements. Seals and gaskets have been produced comprising elements which are made by knitting wire to form a sheet or a knitted tube, rolling the sheet or tube to form a roll or a ring of knitted wire, and then compressing the roll or ring to form a compacted knitted-wire element. Knitted-wire elements of this type have been utilized as the core elements for seals, wherein they are covered with fiberglass fabrics for providing reduced leakage rates. Knitted-wire elements of the this type have also been utilized with various types of filler materials to provide reduced leakage rates so that they can then be used for other types of seals or gaskets.

It has been found that these compacted wire seals can be utilized effectively in applications wherein slow gas-leakage rates can be tolerated. In this connection, it has been found that because of the method by which these types of seals are formed, they have substantially reduced leakage rates in comparison with gaskets made from other types of compacted knitted-wire elements. By heating the knitted wire roll or ring in an atmosphere containing oxygen, oxides are produced on the surface of the wire; and when the roll or ring of knitted wire is thereafter compressed, these oxides fill in some of the void areas between the wires in the mesh to reduce the leakage rates of the seal. When the knitted wire seal is formed into a V-shaped configuration, it has sufficient resiliency in the legs of the V-shape to compensate for minor irregularities in the surfaces of elements with which it is engaged or abutted. When the seal is mounted so that a first element is received in engagement with the inner periphery of the seal and a second element is received in engagement with the outer periphery thereof, the V-shape of the seal and the resiliency and flexibility of the compacted wire mesh construction allow it to be maintained in sealing engagement with the first and second elements regardless of irregularities in the surface configurations. The use of the V-shaped cross section thus has advantages when combined with the above-mentioned method is of forming the seal.

One particular application for the above-described seal is in catalytic converters of the type used for treating exhaust gases from internal combustion engines. Most catalytic converters used in this environment comprise a ceramic monolith on which a platinum catalyst is deposited and through which exhaust gases can pass, a refractory or wire-mesh blanket disposed around the ceramic monolith, a metallic housing in which the monolith and the refractory or wire-mesh blanket are mounted, and a seal disposed between the monolith and the housing. The housing of a catalytic converter of this type is constructed for receiving exhaust gases and for directing them so that they pass through the monolith. The refractory or wire-mesh blanket is provided for protecting and cushioning the monolith so that it does not contact the housing and fracture, and the seal of the catalytic converter is provided so that substantial quantities of exhaust gases do not bypass the monolith, although relatively low leak rates can be tolerated.

It has been found that these types of seals can be made economically and that it is particularly effective to use them in catalytic converters. Specifically, the seal of this type, which is preferably made in a V-shaped configuration, can seal between the monolith and the housing of a catalytic converter by compensating for minor irregularities in the configurations of the housing and/or the monolith due to the inherent flexibility of knitted wire mesh. Further, when the seal is constructed from stainless-steel wire it can withstand the very high temperatures which are often experienced in catalytic converters. Because the seal is formed as an endless ring without seams, it is less likely to damage the monolith element of the catalytic converter. When oxides are caused to form on the surface of the wire in the seal (before compaction into a V-shaped configuration) the seal can effectively meet the leak-rate standards for catalytic converters. Even further, since the oxides on the wire of the seal of the instant invention are actually formed from the metal surface of the wire rather than being formed from an additional filler material coated onto the wire surface, the risk that particulate matter will escape from the seal and contaminate or clog downstream components, such as additional catalytic converter elements or monoliths, is substantially reduced.

The seal is preferably formed so that it has a V-shaped configuration wherein the apex of the V-shape thereof is disposed on one side of the seal and the legs of the V-shape diverge from the apex to define interior and exterior surfaces of the seal. The legs of the seal have an angle of divergence of about 60 degrees for substantially the entire length of the seal.

However, a drawback exists with the above described seal in that compacted knitted wire seals with V shaped cross sections tend to become completely nested within each other during packaging and shipping. Seals of this type typically are packaged front to back and then shipped in this configuration; that is, the exterior of one seal engages the interior of an adjacent seal, so they tend to become frictionally engaged during packaging and shipping. As a result, the seals are difficult to separate from each other. Additionally, identifying the edge of one seal from the edge of an adjacent seal is hampered typically because of the textured appearance of the oxidized wire mesh and because the seal is only about ¼-inch high (with a diameter of about 6 to 20 inches).

Accordingly, two adjacent seals stuck together are often unknowingly assembled into products because the assembler cannot distinguish one seal from another. This accidental assembly of joined seals can create increased pressure on the monolith, causing it to fracture and, eventually, failure of the catalytic converter can occur.

SUMMARY OF THE INVENTION

Given the above mentioned drawbacks, it is an object of the present invention to provide a seal that does not become completely nested when stacked, such as during packaging and shipping.

It is a farther object of the present invention to provide a seal that does not become completely nested during packaging and shipping while retaining compression and leak characteristics of the V-seal.

It is a further object of the present invention to provide a seal that does not become completely nested without changing assembly procedures presently used for integrating the seal into another device, such as a catalytic converter.

It is still a further object of the present invention to provide a seal that does not become completely nested without increasing packaging or manufacturing costs for the seal.

It is also a primary objective of the present invention to provide a method of manufacturing an effective, compacted wire seal that does not become completely nested, especially during packaging and shipping.

In order to alleviate the above mentioned drawbacks a continuous ring seal with a V-shaped cross section is provided wherein the cross section shows an apex section, a pair of legs disposed opposite and diverging from said apex defining interior and exterior surfaces of said seal, and a plurality of protrusions structured and arranged to prevent complete nesting of two of the seals, especially during packaging and shipping. The protrusions have been added to the seal in order to provide a gap between packaged seals so that separation of the seals for use is substantially expedited and assembly with unknowingly joined seals is substantially avoided.

Preferably, four equally spaced protrusions are added to, or formed in, the seal. However, it should be understood that a greater or lesser number of protrusions may be employed and the protrusions maybe located at various distances from each other. The protrusions are created by changing the angle of divergence of the legs of the seal for a relatively short length in which the protrusion is designed to exist. A protrusion is created large enough to provide a gap between seals during packaging in the fashion described above, namely, front to back, and nesting is therefore prevented.

Another embodiment of the present invention is a catalytic converter having continuous ring seal with a V-shaped cross section, wherein the continuous ring seal includes an apex in cross section, a first leg and a second leg disposed opposite and diverging from the apex defining interior and exterior surfaces of the seal, and a plurality of equally spaced protrusions disposed on the apex section and comprises a first portion juxtaposed to the first leg and a second portion juxtaposed to the second leg. The first leg has a first angle of divergence, the second leg has a second angle of divergence, the first portion of the each one of the protrusions has a third angle of divergence and the second portion of the each one of the protrusions has a fourth angle of divergence. The first, second, third and fourth angles of divergence differ sufficiently to prevent complete nesting of two of the seals.

Yet another embodiment of the present invention is a vehicle powered by an internal combustion chamber engine with a catalytic converter having a continuous ring seal having a V-shaped cross section, where the continuous ring seal includes an apex in cross section, a pair of legs disposed opposite and diverging from the apex defining interior and exterior surfaces of the seal, and a plurality of equally spaced protrusions structured and arranged to prevent complete nesting of said seal during packaging and shipping.

The present invention also encompasses a method of forming the V-shaped seals with protrusions. The method includes the steps of knitting an elongated wire, which may be either flat or tubular in configuration, to form a sheet of knitted wire and rolling the sheet to form a roll or ring of knitted wire. Thereafter the roll or ring of knitted wire is heated in an atmosphere containing oxygen to form oxides on the surface of the wire and to anneal the wire, and then compressed in a die cavity to form a compacted wire seal. In the preferred form of the method, the wire comprises stainless-steel wire, most preferably before it is knitted. In the preferred form of practicing the method, the knitted wire is formed into a tube, and the tube is rolled on itself from both ends to form two adjacent rolls. In another preferred form of practicing the method, the heating step is carried out so that oxides are formed on the surfaces of the wire in an amount comprising at least approximately 0.01 mm$^3$ oxide per cm$^2$ of wire surface. Preferably, the oxides are formed on the surfaces of the wire in an amount comprising at least approximately 0.025 mm$^3$ oxide per cm$^2$ of wire surface. Most preferably, the oxides are formed on the surfaces of the wire in an amount comprising at least approximately 0.1 mm$^3$ oxide per cm$^2$ of wire surface.

In the compressing step, the rolled oxidized wire preferably is compressed to a density wherein it comprises at least approximately 45% by volume of wire and oxide. In another preferred embodiment of the instant method, after the wire has been knitted to form a tube, rolled on itself to form a knitted-wire ring, and heated to form the oxides on the wire and to anneal the wire, the ring is then compressed in a die cavity to form a compacted wire-ring seal having a V-shaped cross-sectional configuration with protrusions disposed in various locations around the seal. Specifically, the seal is preferably formed so that it has a V-shaped configuration wherein the apex of the V-shape thereof is disposed on one side of the seal and the legs of the V-shape diverge from the centerline of apex to define the interior and exterior surfaces of the seal. The legs of the seal have an angle of divergence preferably of about 60 degrees for substantially the entire length of the seal and, preferably, four equally spaced protrusions are created to form an angle of divergence for the legs of the seal of about 40 degrees for about 1 millimeter in length. It is understood, however, that various numbers of protrusions with other angles of divergence can be employed, and that the protrusions may be located at various locations on the seal.

It is a novel feature of the present invention to prevent nesting of the seals while maintaining the prior art advantages. Modification of present assembly procedures, which can lead to changes in current V-Seal compression and leak characteristics and increases in packaging or manufacturing costs, need to be avoided. Heretofore it has not been possible to accomplish the above mentioned objectives and prevent complete nesting.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention:

FIG. 2a is an elevational view of a knitted sock which has been rolled into a ring;

FIG. 2b is a sectional view taken along line 2b—2b in FIG. 2a;

DETAILED DESCRIPTION OF PREFERRED EMBODIMENTS

Figure 1:
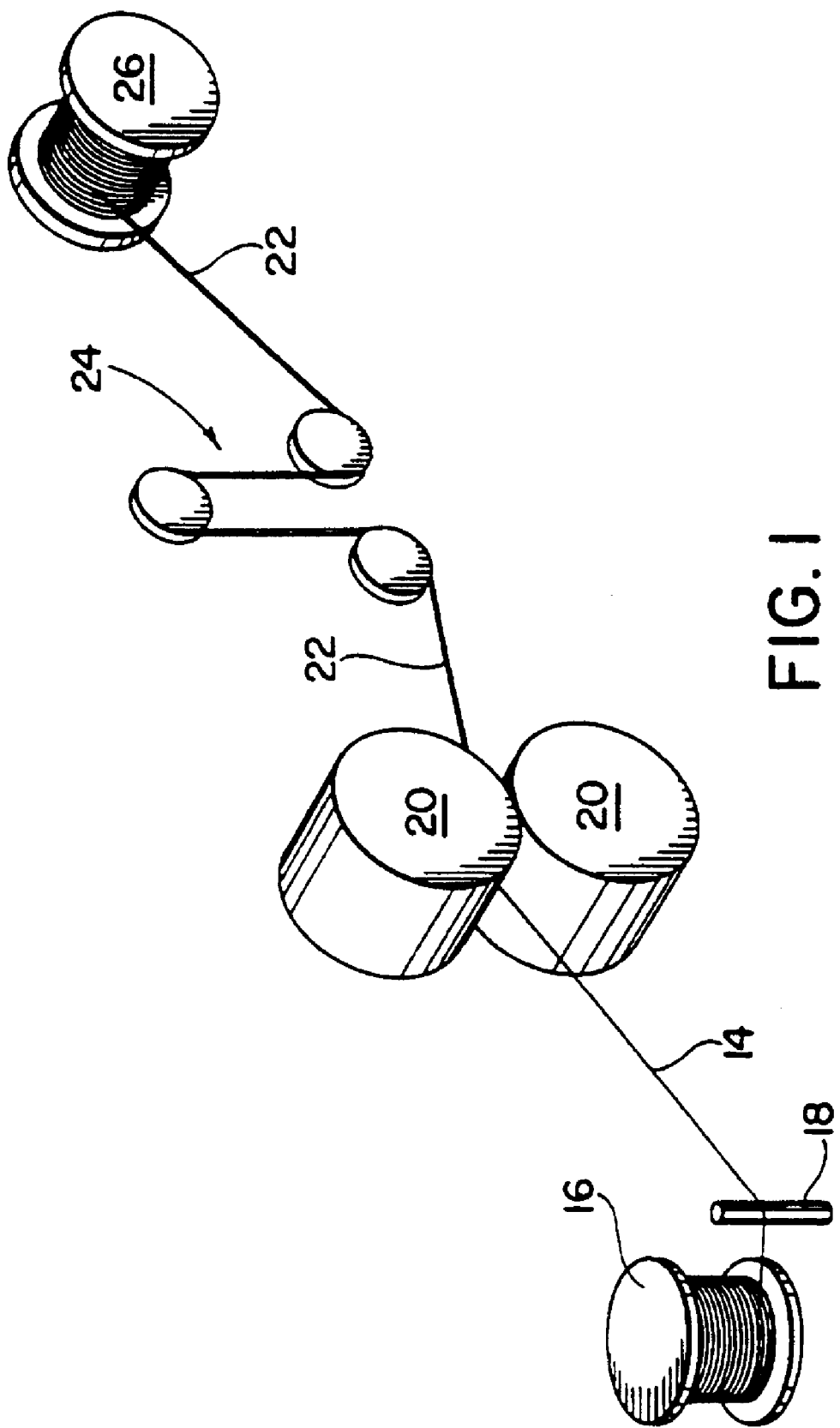
FIG. 1 is a perspective view of the flattening step of the method of the present invention.

Referring now to the drawings, the method of the instant invention is illustrated in FIGS. 1 through 6, and the seal of the instant invention, which is made by the method, is illustrated in FIGS. 7 through 13 and generally indicated at 10 therein. Seal 10 as herein embodied is formed as a continuous ring having a V-shaped cross-sectional configuration as illustrated most clearly in FIGS. 9–11, and it is particularly adapted for use in a catalytic converter of the type illustrated in FIG. 7 and generally indicated at 12 as will hereinafter be more fully set forth. It will be understood, however, that a variety of other uses for the seal of the instant invention in both high-temperature and low-temperature applications are contemplated.

Referring first to FIG. 1, the first step of the method of forming the seal of the instant invention is illustrated. As will be seen, in the first step of the method, wire 14 is unwound from spool 16 so that it passes around alignment pin 18 and between a pair of hardened flattening rollers 20 to produce flattened wire 22. Wire 14 preferably comprises a stainless-steel wire having a diameter which is preferably less than approximately 0.020 inch, and flattened wire 22 is preferably flattened to a thickness of approximately 0.001 inch as it is passed between the flattening rollers 20. After wire 14 has been passed between the flattening rollers 20, flattened wire 22 thereby formed is passed over dancer-roller assembly 24 to maintain adequate tension in wire 22, and then flattened wire 22 is wound on take-up spool 26.

Figure 2:
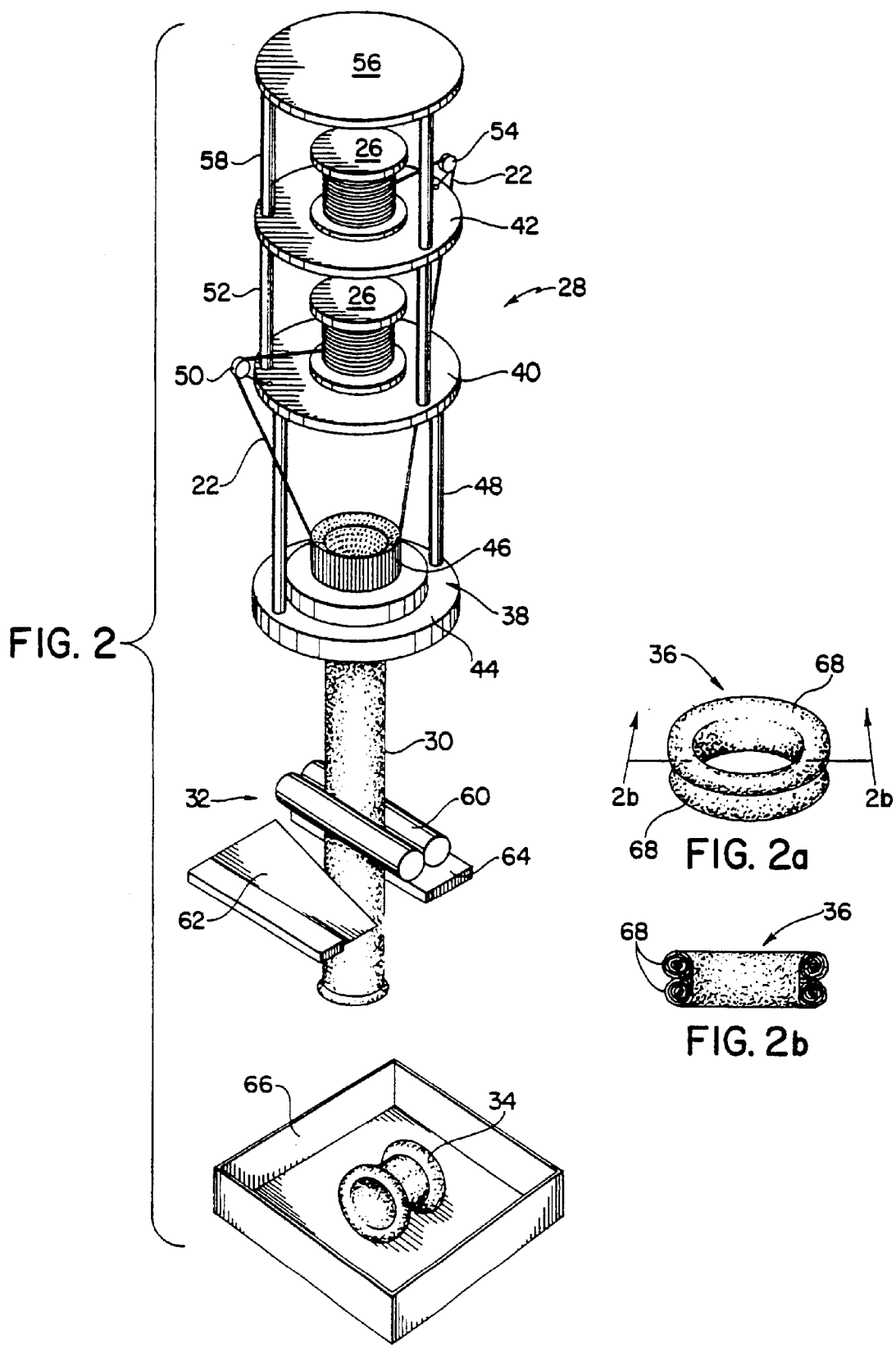
FIG. 2 is a perspective view illustrating the knitting step of the method.

In the second step of the method which is illustrated in FIG. 2, flattened wire 22 is knitted in a knitting assembly generally indicated at 28 to form a continuous tubular knitted sock 30, where sock 30 is cut by means of cutting assembly 32 to form tubular sock sections 34 of a predetermined length. As will be seen, tubular sock sections 34 are partially rolled upon themselves from the opposite ends thereof as a result of the natural characteristics of knitted sock 30. However, in accordance with the preferred form of the method, they are further rolled upon themselves in a subsequent step to form rolled rings 36 as will hereinafter be more fully set forth. It will also be understood that other forms of the method wherein wire 22 is knitted into sheets of nontubular configuration to make seals of non-ring-like configurations, such as elongated seal strips, are contemplated.

Knitting assembly 28 comprises knitting head 38, first spool-support frame 40 and second spool-support frame 42. Knitting head 38 comprises base 44 and knitting needle assembly 46 on base 44, and it is operative in a conventional manner for producing tubular knitted-wire socks. More specifically, it is operative in a manner similar to the apparatus disclosed in the U.S. Pat. Nos. 2,445,231 and 2,425,293 to McDermott for producing tubular knitted-wire sock 30. First spool-support frame 40 is mounted in spaced relation above knitting head 38 on columns 48, and first spool 26 containing flattened wire 22 is rotatably received in frame 40 so that wire 22 therefrom passes over guide roller 50 on frame 40 and downwardly to knitting needle assembly 46. Similarly, second spool-support frame 42 is mounted in spaced relation above first spool-support frame 40 on columns 52, second spool 26 of flattened wire 22 is rotatably supported on second frame 42, and wire 22 from spool 26 on the second frame 42 passes over a guide roller 54 and downwardly to knitting needle assembly 46. Cover plate 56 is mounted on columns 58 above support plate 42. Cutting assembly 32 comprises a pair of rollers 60 which draw (stock 30) downwardly from knitting head 38 as it is formed therein, and cutting blade 62 which is operative in cooperation with base plate 64 for cutting sock 30 to form the sock sections 34 which fall into container 66 as they are cut.

In the next step of the method, tubular sock sections 34 are rolled on themselves from their respective opposite ends to form rings 36 which each comprise a pair of adjacent rolls 68 as illustrated in FIGS. 2a and 2b. It will be understood that in other forms of the method wherein sheets of knitted wire are formed in non tubular configurations, such as flattened sheets, the sheets are rolled in a similar manner in this step of the method. In any event, as illustrated in FIG. 2b, because sock sections 34 are each rolled from both ends thereof to form rings 36, there is a more even distribution of wire material in seal 10 which is eventually formed in the remaining steps of the method of the instant invention, and seal 10 comprises a greater quantity of wire material in the circumferential portions thereof. Specifically, because ring 36 comprises a pair of rolls 68, the outer circumferential surfaces of seal 10 which is eventually formed include the outer layers of material from both of the rolls 68 rather than from single roll 68.

Figure 3:
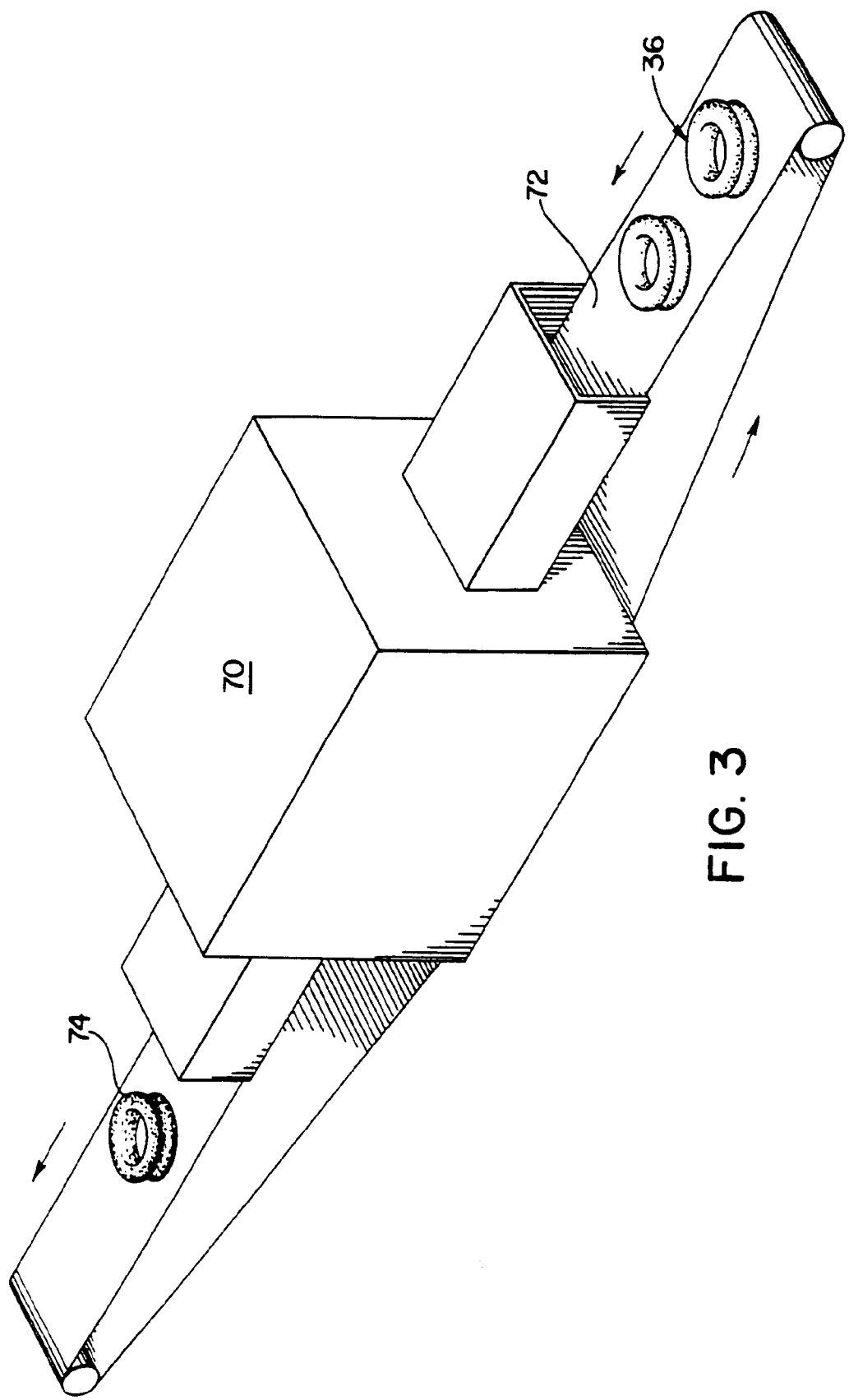
FIG. 3 is a perspective view of the heating step of the method.

In the next step of the method of the instant invention which is illustrated in FIG. 3, rings 36 or other elements formed in the preceding steps are heated in furnace 70 to anneal wire 22 therein and to form oxides on the surfaces of wire 22. More specifically, rings 36 are passed through furnace 70 on belt 72 in order to form annealed and oxidized rings 74 which are darkened in appearance as a result of the oxides which are formed on the surfaces thereof. In this connection, while most annealing operations of this type are carried out in oxygen-free atmospheres to prevent the formation of oxides, oven 70 is operated in the presence of air so that oxides are formed on the surfaces of wire 22 in rings 36. Oven 70 is preferably operated at a temperature in excess of 1950 degrees F., and it is preferably operated so that rings 36 which are passed therethrough have residence times in oven 70 of between two and three minutes, it having been found that these conditions are sufficient to both anneal wire 22 in rings 36 and to produce the desired quantities of oxides on the surfaces thereof. In this regard, the annealed and oxidized rings 74 preferably comprise at least approximately 0.01 $mm^3$ oxide per $cm^2$ of wire surface area and preferably approximately 0.025 $mm^3$ oxide per $cm^2$ of surface area and most preferably approximately 0.1 $mm^3$ oxide per $cm^2$ of wire surface.

Figure 4:
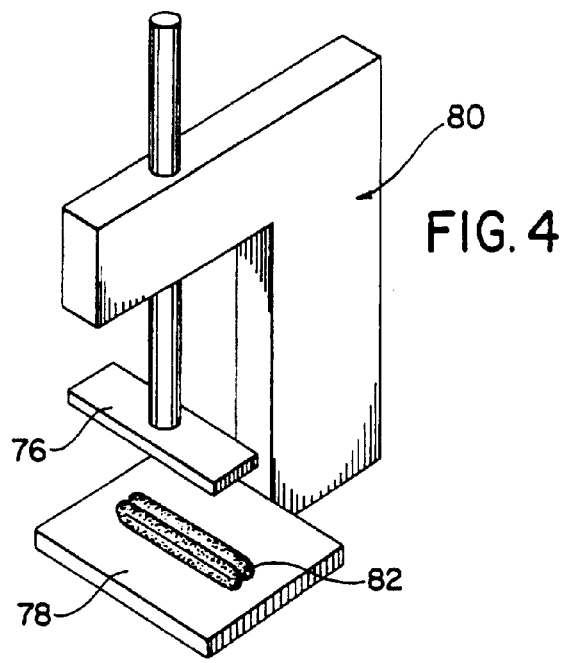
FIGS. 4 through 6 are sequential perspective views illustrating the compressing step.
Figure 5:
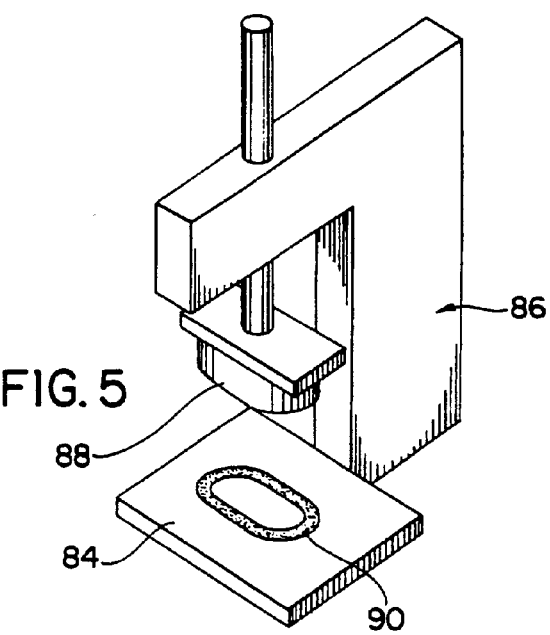
Figure 6:
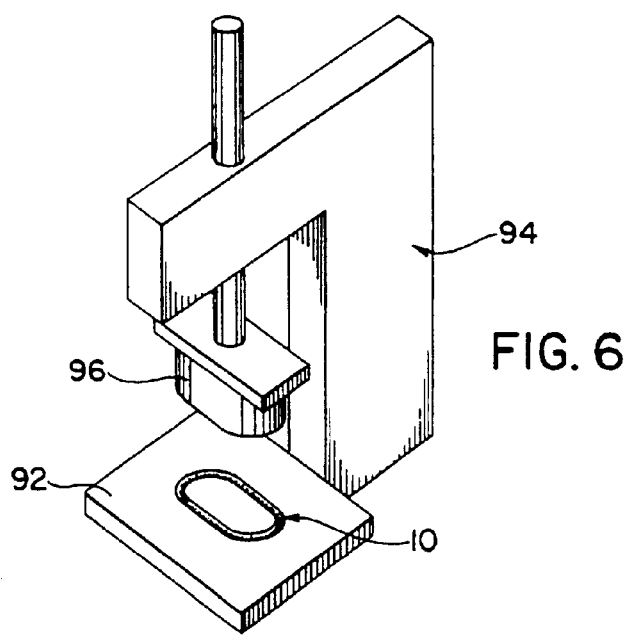
Figure 9:
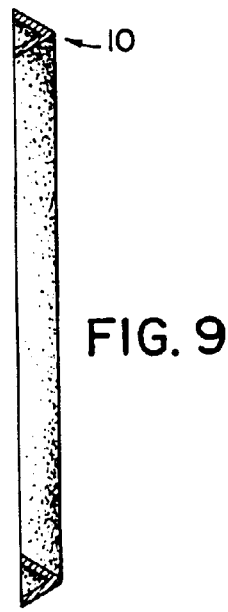
FIG. 9 is a sectional view taken along line 9—9 in FIG. 8.

In the next step of the method of the instant invention, the annealed and oxidized rings 74 are compressed in the manner illustrated in FIGS. 4 through 6 to form seal 10, it being understood that other elements made by the method of the instant invention in non-ring-like configurations would be compressed in a similar manner. As illustrated in FIG. 4, ring 74 is first pressed between a pair of substantially flat plates 76 and 78 in first press 80 to form a flattened ring 82. Thereafter, as illustrated in FIG. 5, ring 82 is assembled in a die cavity in die 84 of second press 86 and compressed in the die cavity of die 84 with second die 88 to form partially-compressed ring 90. Thereafter, as illustrated in FIG. 6, partially-compressed ring 90 is assembled in a die cavity in die 92 of third press 94, and partially-compressed ring 90 is further compressed with die 96 of press 94 to produce seal 10. In this connection, dies 84 and 88 and dies 92 and 96 are configured so that seal 10 is formed in an oval configuration and so that it has a V-shaped cross-sectional configuration, as illustrated in FIG. 9. In this regard, dies 84, 88, 92 and 96 are configured so that apex 115 of the V-shape of seal 10 is disposed on one side thereof and so that a pair of legs, where each leg is designated by reference 112, of the V-shape of seal 10 is disposed opposite and diverging from apex 115 to define interior surface 113 and exterior surface 114 of the oval configuration thereof (see FIG. 10). Preferably, seal 10 is compressed in presses 86 and 94 so that it has a density wherein it comprises at least approximately 45% wire and oxide. Further, the V-shaped configuration of seal 10 is preferably formed with legs 112 having an angle of divergence of about 60 degrees with respect to apex 115 for substantially the entire length of the oval shaped seal. In addition, during compression, the V-shaped configuration of seal 10 is formed with a plurality of protrusions 117 structured and arranged to prevent complete nesting seals 10 during packaging and shipping. Protrusions 117, having sides 118 (see FIG. 11), extend from apex 115 and sides 118 form an angle of divergence of about 40 degrees for about 1 millimeter along the length of the seal.

It has been found that seal 10 which is manufactured in accordance with the hereinabove-described method can be effectively utilized for sealing applications, wherein low gas-leakage rates can be tolerated. In this connection, the oxides which are produced on the surfaces of wire 22 in the rings 74 before rings 74 are compressed tend to fill in the voids which inherently occur between the pieces of wire 22 in seal 10 so that the oxides substantially reduce the rates at which gases can pass or leak through seal 10. Further, the V-shaped cross-sectional configuration of seal 10 makes it sufficiently resiliently flexible to compensate for minor irregularities in the configurations of elements with which it is positioned in engagement. More specifically, legs 112 of the V-shaped cross-sectional configuration of seal 10 can be resiliently compressed together to compensate for irregularities in the configurations of elements with which seal 10 is positioned in engagement.

Figure 7:
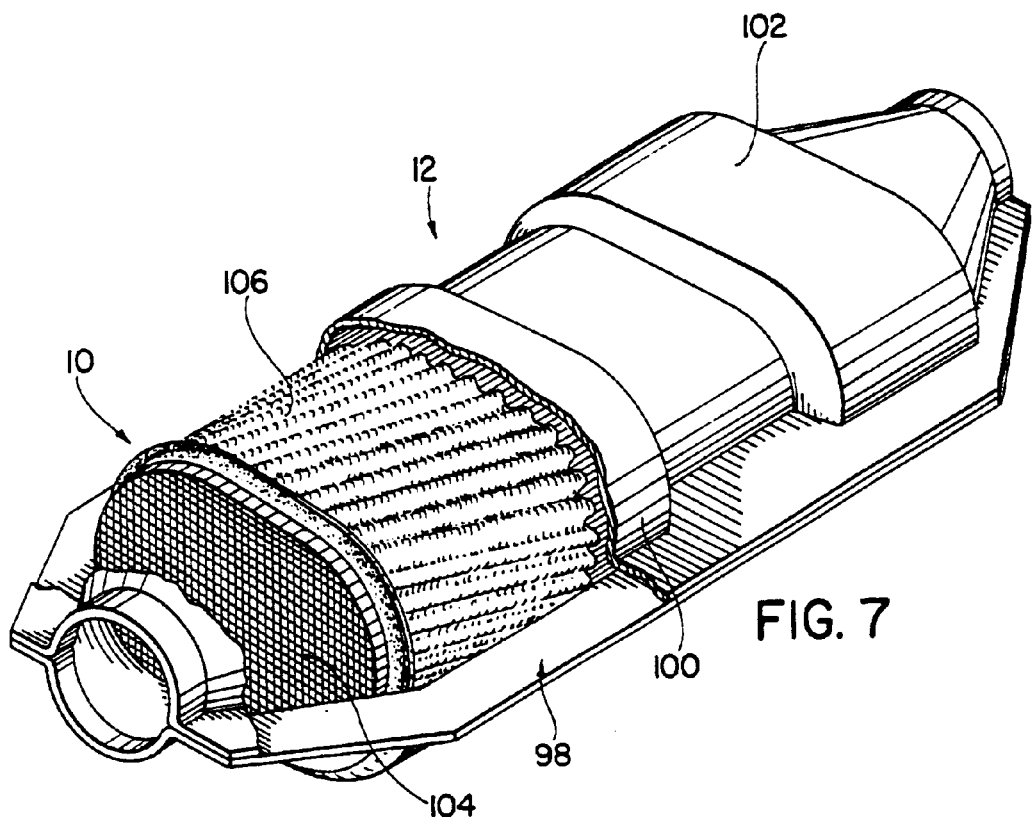
FIG. 7 is a fragmentary perspective view of a catalytic converter comprising the seal of the instant invention.
Figure 8:
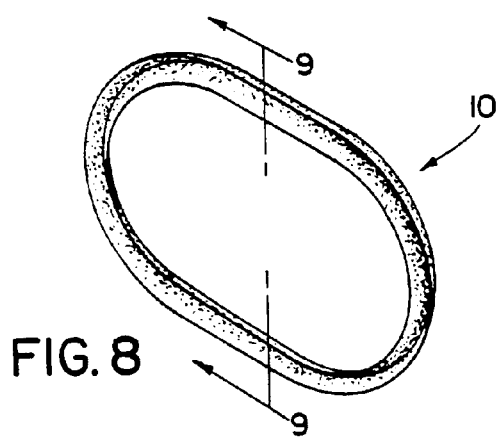
FIG. 8 is a perspective view of the present invention per se.

The use of seal 10 in catalytic converter 12 is illustrated in FIG. 7. As will be seen, catalytic converter 12 comprises a split housing generally indicated at 98 which includes primary and secondary housing sections 100 and 102. Contained within each of the housing sections 100 and 102 is a monolith 104 having a catalyst, such as platinum, deposited on the surfaces thereof, a wire-mesh blanket 106 which is wrapped around the monolith 104, and a seal 10 which is received on monolith 104 adjacent the upstream end thereof and adjacent the blanket 106 thereon. When seal 10 is assembled in converter 12 in this manner, it snugly engages both monolith 104 and housing 98, and thus provides a seal between housing 98 and monolith 104 which substantially restricts the amount of gases which can pass through housing 98 without passing through the adjacent monolith 104. Because seal 10 is preferably made from stainless-steel wire, it can withstand extremely high temperatures to which it is likely to be exposed in catalytic converter 12; and because seal 10 is made without the addition of filler materials, it can be manufactured economically and is not likely to emit particulate matter which will contaminate monolith 104 in secondary housing section 102.

It is important that seal 10 retain the above mentioned characteristics, namely, no interference with present assembly procedures, no changes in current V-Seal compression and leak characteristics, and no increase in packaging or manufacturing costs.

Figure 10:
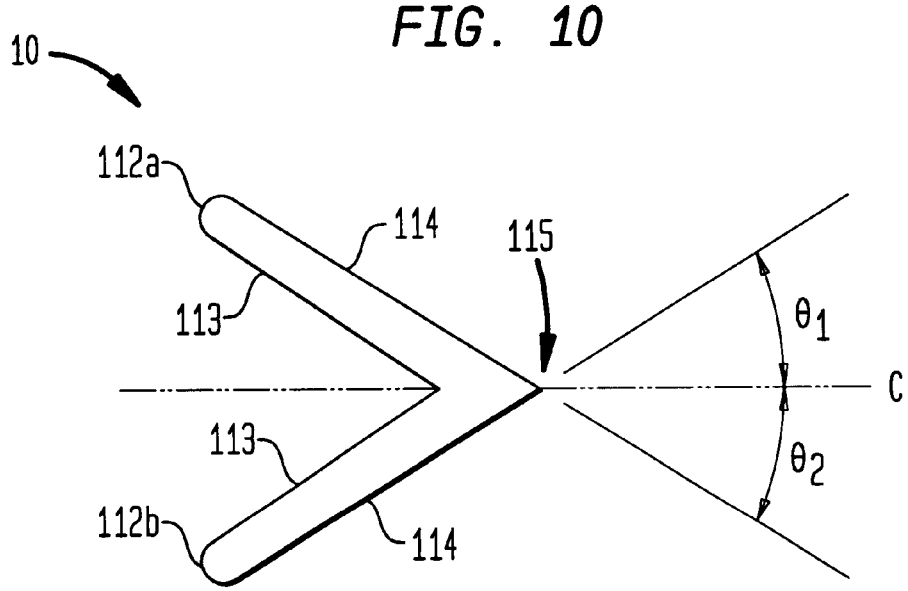
FIG. 10 is a cross sectional view of the present invention at a location without a protrusion.
Figure 11:
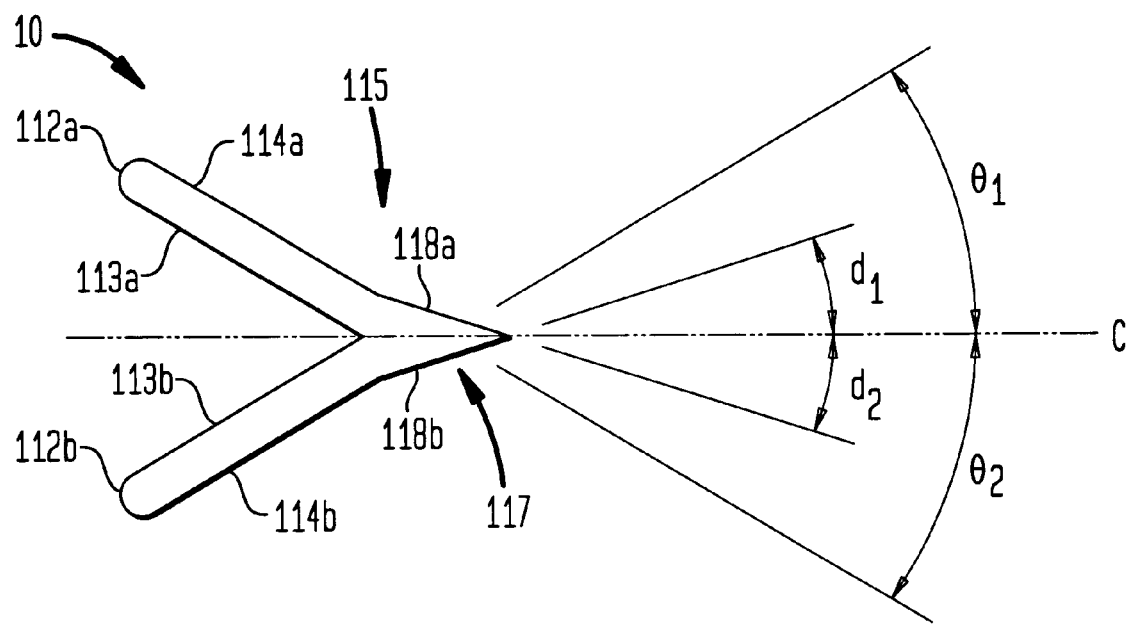
FIG. 11 is cross sectional view of the present invention at a location with a protrusion.

Referring to FIG. 10 where shown is an idealized close-up of one edge in the cross section shown in FIG. 9, seal 10 in accordance with the present invention can be seen with legs 112A and 112B. It can be seen that legs 112A and 112B are diverging from the centerline C of apex 115. Leg 112A has a first angle of divergence $\theta_2$ and Leg 112B has an second angle of divergence $\theta_1$. Preferably each angle of divergence $\theta_1$ and $\theta_2$ are each equal to about 60 degrees from the centerline, although it should be understood that other angles are sufficient and that $\theta_1$ and $\theta_2$ need not be equivalent. Legs 112A and 112B define interior surface 113 and exterior surface 114 of seal 10. Referring to FIG. 11, in accordance with the present invention, protrusion 117 includes sides 118A and 118B. Side 118A is juxtaposed to leg 112A and side 118B is juxtaposed to leg 112B. Each side 118A and 118B extends from apex 115 and from third and fourth angles of divergence $\alpha_1$ and $\alpha_2$ respectively. Preferably, third and fourth angles of divergence $\alpha_1$ and $\alpha_2$ are each equal to about 40 degrees from the centerline; again, it should be understood that other angles are sufficient and that $\alpha_1$ and $\alpha_2$ need not be equivalent. In the preferred embodiment of seal 10, protrusion 117 is about 1 millimeter in length and the height of the seal is about 6.4 mm, although it is understood that other lengths along the circumference of seal 10 are sufficient. In essence, to practice this invention the length of the protrusion and the difference between $\alpha_1$ and $\alpha_2$ and $\theta_1$ and $\theta_2$, respectively, need only be sufficient to prevent nesting of the seals. That is, while one seal will, to a certain extent fit within another seal, the side formed by 114a and 118a of one seal does not conform to the corresponding side 113a of the seal into which it nests.

Because the sides do not conform there are two advantages that prevent the prior art problems noted above. First, when the inner (e.g., 113a) and outer (e.g., 114a and 118a) corresponding sides of adject nested seals conform, there is sufficient surface in contact so that the seals can be stuck together. When the typically height of the seal (½ inch) is significantly less than the size of the seal (about 10 inches in diameter), it is difficult for the operator to determine that two nested seals are actually stuck together because the edges are not distinct (e.g., where 114a meets 113a on each of two adjacent nested seals; 121 in FIG. 13). In this invention, because the corresponding sides of adjacent nested seals do conform, there is less surface area in contact and so it is less likely two seals will be stuck together. Second, because $\alpha_1$ and $\alpha_2$ are each less than $\theta_1$ and $\theta_2$ the protrusion 117 effectively adds a small separation to adjacent nested seals. This small separation not only prevents conformance of the sides of adjacent nested seals, but also acts to separate the edges of each seal from the next, facilitating operation cognizance of the existence of two nested seals. Thus, non-conformance of the sides prevents adjacent seals from being stuck together, and the separation facilitated by the protrusion makes it easier for the assembler to see the edge of each seal.

Figure 12:
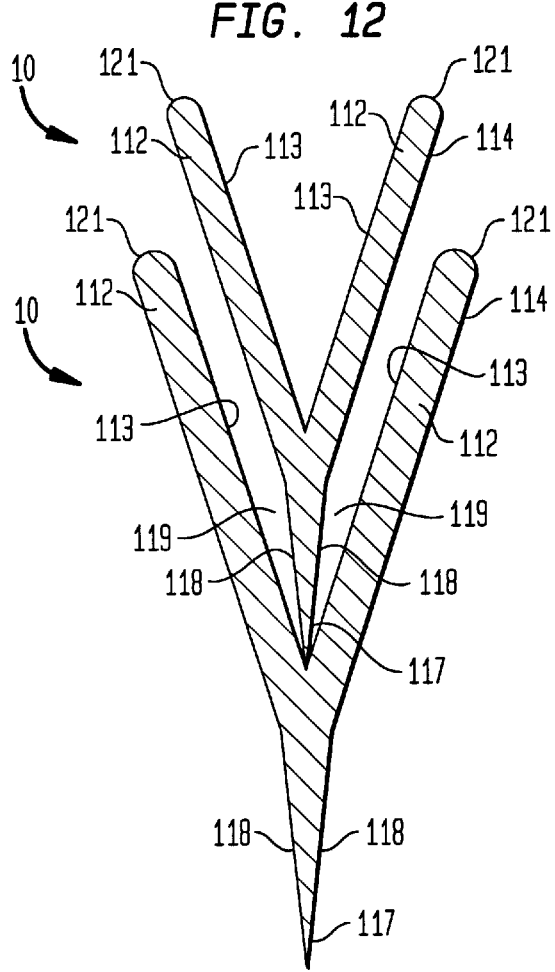
FIG. 12 is a cross sectional view of the present invention at a location with a protrusion in engagement with another seal during packaging.

As shown in FIG. 12, when stacked, nested, or packaged, protrusion 117 prevents frictional engagement of exterior surface 114 of one seal 10 with interior surface 113 of an adjacently packaged seal 10, thereby preventing complete nesting of the seals 10. Gaps 119 exist between exterior surface 114 of one seal 10 and interior surface 113 of the adjacent seal 10, expediting the separation of seals 10 for use. Ends 121 of legs 112 are thus also separated, facilitating an assembler's selection of a single seal.

Figure 13:
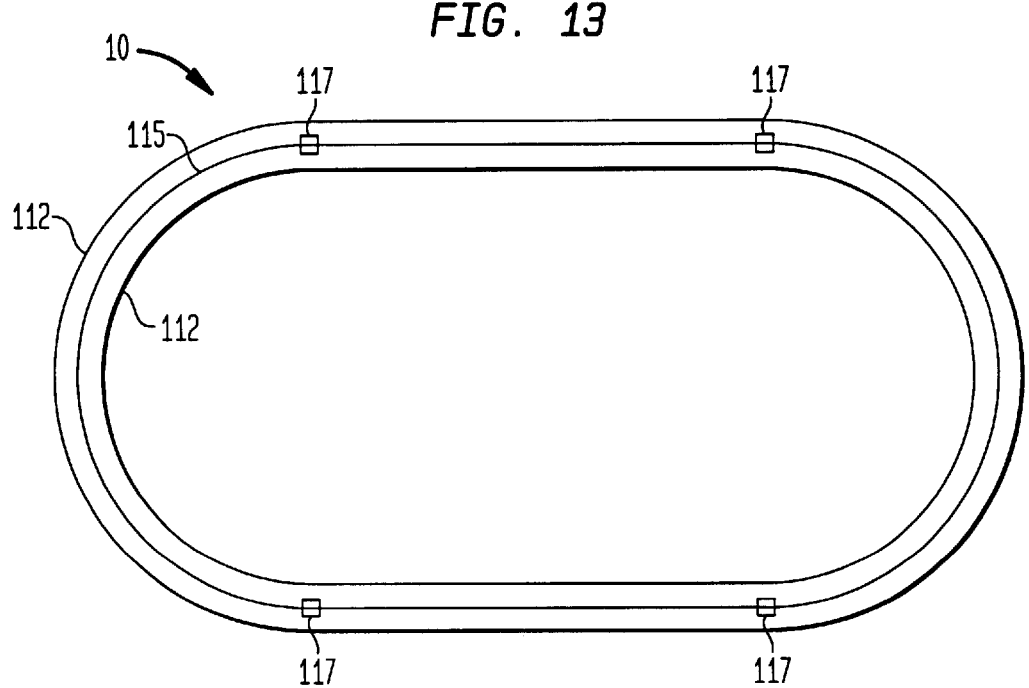
FIG. 13 is a bottom plan view of the present invention.

FIG. 13 shows the preferred embodiment of seal 10 with four protrusions 117 equally spaced apart from one another. There are preferably at least two protrusions and preferably not more than eight protrusions. Alternatively, the entire edge at apex 115 can be modified to provide divergence between $\alpha_1$ and $\alpha_2$ and $\theta_1$ and $\theta_2$ along the edge at apex 115 of the seal.

It should also be understood that $\alpha_1$ and $\alpha_2$ could be larger than $\theta_1$ and $\theta_2$, in which case the protrusion would appear as a large arrowhead, with two edges abutting an adjacent seal. Such an embodiment is less preferred because there is comparatively more contact between adjacent seals than with the preferred embodiments, but still less contact than if no protrusion existed. Likewise, $\alpha_1$ may be different than $\theta_2$. Even further, but less preferred, $\alpha_1$ and $\theta_1$ may be equal, while $\alpha_2$ is different from and less than $\theta_2$, in which case at least one of the sides 114a (e.g., as would be shown in FIG. 13) does not conform with the corresponding side 113a of the adjacent seal, while 114b and 113b would conform; again, non-conformance of the side decreases the surface area for frictional engagement and provides separation from adjacent edges 121.

This novel seal is made preferably by modifying the die cavity in the die 92 so that the resultant compressed ring has the protrusion formed internally therewith; thus, the die cavity preferably has four sections in which a protrusion is formed at the apex.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A continuous ring seal with a V-shaped cross section, comprising:
   an apex section;
   a pair of legs disposed opposite and diverging from said apex defining interior and exterior surfaces of said seal; and
   a plurality of protrusions structured and arranged on said apex section to prevent complete nesting of two adjacent seals.

2. The continuous ring seal according to claim 1 wherein said pair of legs further comprise a first leg and a second leg and wherein each one of said plurality of protrusions are disposed on said apex section and comprises a first portion juxtaposed to said first leg and a second portion juxtaposed to said second leg.

3. The continuous ring seal according to claim 2, wherein the V-shaped cross section defines a centerline bisecting said V-shape, said first leg having an angle of divergence $\theta_1$ from said centerline, said second leg having an angle of divergence $\theta_2$ from said centerline, said first portion having an angle of divergence $\alpha_1$ from said centerline, and said second portion having an angle of divergence $\alpha_2$ from said centerline, wherein $\alpha_1 \neq \theta_1$, or $\alpha_2 \neq \theta_2$, or both, by an amount sufficient to prevent complete nesting of two adjacent seals.

4. The continuous ring seal according to claim 3, wherein at least one of $\theta_1$ and $\theta_2$ is about 60 degrees.

5. The catalytic converter according to claim 14, wherein the V-shaped cross section defines a centerline bisecting said V-shape, said first leg having an angle of divergence $\theta_1$ from said centerline, said second leg having an angle of divergence $\theta_2$ from said centerline, said first portion having an angle of divergence $\alpha_1$ from said centerline, and said second portion having an angle of divergence $\alpha_2$ from said centerline, wherein $\alpha_1 \neq \theta_1$, or $\alpha_2 \neq \alpha_2$, or both, by an amount sufficient to prevent complete nesting of two adjacent seals.

6. The continuous ring seal according to claim 2, wherein each one of said plurality of protrusions has a length of about 1 millimeter.

7. The continuous ring seal according to claim 2, wherein said plurality of protrusions are equally spaced throughout said continuous ring seal.

8. The continuous ring seal according to claim 1, wherein said seal is formed of a knitted wire mesh.

9. The continuous ring seal according to claim 8, wherein said knitted wire mesh is formed of stainless steel wire.

10. The continuous ring seal according to claim 8, further comprising at least approximately 0.01 $mm^3$ oxide per $cm^2$ of wire surface area.

11. The continuous ring seal according to claim 10, further comprising at least approximately 0.025 $mm^3$ oxide per $cm^2$ of wire surface area.

12. The continuous ring seal according to claim 11, firer comprising at least approximately 0.1 $mm^3$ oxide per $cm^2$ of wire surface area.

13. The seal of claim 3, wherein $\alpha_1$ is less than $\theta_1$ and $\alpha_2$ is less than $\theta_2$.

14. A catalytic converter having a continuous ring seal having a V-shaped cross section, wherein said continuous ring seal comprises:
   an apex section;
   a first leg and second leg disposed opposite and diverging from said apex defining interior and exterior surfaces of said seal; and
   a plurality of equally spaced protrusions disposed on said apex section, each one of said plurality of protrusions comprises a first portion juxtaposed to said first leg and a second portion juxtaposed to said second leg wherein said protrusions prevent complete nesting of two adjacent seals.

15. The catalytic converter according to claim 14, wherein the V-shaped cross section of the ring seal defines a centerline bisecting said V-shape, said first leg having an angle of divergence $\theta_1$ from said centerline, said second leg having an angle of divergence $\theta_2$ from said centerline, said first portion having an angle of divergence $\alpha_1$, from said centerline, and said second portion having an angle of divergence $\alpha_2$ from said centerline, wherein said angles of divergence $\alpha_1$ and $\alpha_2$ and $\theta_1$ and $\theta_2$ differ sufficiently to prevent complete nesting of two of adjacent seals.

16. The continuous ring seal according to claim 15, wherein at least one of $\theta_1$ and $\theta_2$ is about 60 degrees.

17. The continuous ring seal according to claim 15 wherein at least one of $\alpha_1$ and $\alpha_2$ and is about 40 degrees.

18. The catalytic converter according to claim 14 wherein each one of said plurality of protrusions have a length of about 1 millimeters.

19. A vehicle powered by an internal combustion chamber engine with a catalytic converter as defined by claim 14.

* * * * *

UNITED STATES PATENT AND TRADEMARK OFFICE
CERTIFICATE OF CORRECTION

PATENT NO. : 6,286,840 B1
DATED : September 11, 2001
INVENTOR(S) : Zettel

It is certified that error appears in the above-identified patent and that said Letters Patent is hereby corrected as shown below:

Claim 5,
Line 8, $\alpha_2 \neq \alpha_2$ should be changed to -- $\alpha_2 \neq 0_2$ --.

Claim 12,
Line 1, "firer" should be changed to -- further --.

Signed and Sealed this

Twelfth Day of March, 2002

Attest:

JAMES E. ROGAN
Attesting Officer      Director of the United States Patent and Trademark Office